United States Patent
Jakob

(10) Patent No.: US 8,132,991 B2
(45) Date of Patent: Mar. 13, 2012

(54) PROTECTION DEVICE FOR A MOTOR SPINDLE

(75) Inventor: Ludwig Jakob, Kleinwallstadt (DE)

(73) Assignee: Jakob Antriebstechnik GmbH, Kleinwallstadt (DE)

( * ) Notice: Subject to any disclaimer, the term of this patent is extended or adjusted under 35 U.S.C. 154(b) by 800 days.

(21) Appl. No.: 12/169,219

(22) Filed: Jul. 8, 2008

(65) Prior Publication Data

US 2009/0018001 A1 Jan. 15, 2009

(30) Foreign Application Priority Data

Jul. 12, 2007 (DE) .................. 10 2007 032 498

(51) Int. Cl.
*B23Q 5/04* (2006.01)
*B23Q 5/58* (2006.01)
*B23Q 11/00* (2006.01)

(52) U.S. Cl. ............ 409/231; 409/134; 82/146; 82/147; 192/56.1; 464/30; 248/671; 248/672; 248/309.2; 248/575; 310/51; 408/6

(58) Field of Classification Search .................. 408/5, 6, 408/8, 10, 11, 13, 239 R, 239 A; 82/146, 82/147, 152, 153, 163, 903; 192/56.1; 464/30–37; 248/671, 672, 309.2, 638, 575; 310/51, 91; 409/134, 231, 232, 138–140
See application file for complete search history.

(56) References Cited

U.S. PATENT DOCUMENTS

| | | | | |
|---|---|---|---|---|
| 2,468,396 | A * | 4/1949 | Frisco | 279/18 |
| 5,517,746 | A * | 5/1996 | Cox et al. | 29/560 |
| 6,357,565 | B1 * | 3/2002 | Bolledi et al. | 188/371 |
| 6,368,012 | B1 * | 4/2002 | St. Onge et al. | 403/368 |
| 6,491,587 | B1 * | 12/2002 | Rich | 464/33 |
| 2004/0052601 | A1 * | 3/2004 | Bernhard et al. | 409/231 |

FOREIGN PATENT DOCUMENTS

| | | |
|---|---|---|
| DE | 195 27 561 | 1/1997 |
| DE | 102 57 610 | 6/2004 |
| EP | 1 371 537 | 5/2003 |
| JP | 64-002811 A * | 1/1989 |

* cited by examiner

*Primary Examiner* — Erica E Cadugan
(74) *Attorney, Agent, or Firm* — Martin Fleit; Paul D. Bianco; Fleit Gibbons Gutman Bongini & Bianco PL

(57) ABSTRACT

The invention relates to a protection device for a motor spindle (1) arranged in a housing (2), particularly of a machine tool, having an inner ring (6) fixedly joined to the motor spindle (1) and an outer ring joined to the housing (2). The inner ring (6) is arranged in the outer ring (7) in a way permitting axial motion and a tilting motion, and is placed under elastically resilient preload against the outer ring (7) by means of preloading members (8).

10 Claims, 1 Drawing Sheet

PROTECTION DEVICE FOR A MOTOR SPINDLE

CROSS REFERENCE TO RELATED APPLICATION

This application claims priority under 35 U.S.C. §119 to German Patent Application No. 10 2007 032 498.9 filed Jul. 12, 2007, the entire contents of which are incorporated herein by reference.

FIELD OF THE INVENTION

The invention relates to a protection device for protecting a motor spindle from impact damage.

BACKGROUND OF THE INVENTION

Today the work spindles of many machine tools (above all, milling and grinding spindles, but also driven tool shafts on lathes, etc.) are in many cases implemented as motor spindles. With these, the actual work spindle, with bearing arrangement and electric drive as well as the tool holder with chucking system and release unit, internal lubricant feed, cooling etc., is combined into a compact drive assembly that is attached with screws or clamped to a feed carriage of said machine tool. As a result of a drive free of shear force or torsional play, the motor spindles feature, in comparison to conventional solutions having an external drive by means of couplings, belts or gears, the advantage of a greater running smoothness and fewer run-out errors, and have in addition, due to the lower rotating mass, shorter run-up times and braking times, with an improved workpiece surface quality being achievable together with simultaneously lower primary processing times. As a result of the high feed rates and accelerations, the mass of the spindle and of the feed carriage produces a kinetic energy that is substantially greater than the force from the feed drive, and can also not be diverted by means of a safety clutch at the feed shaft. For this reason, special protection measures must be met in order to protect the motor spindle from impact damage or the like. High-precision heavy-duty spindle ball bearings, in particular, can be damaged very quickly in the event of a collision caused by operator error or programming error; this is associated with considerable repair costs as well as lengthy machine downtimes for dismantling the motor spindle and installing a replacement spindle to be kept on hand.

Known from DE 195 27 561 A1 is an impact protection for a motor milling spindle of a machine tool, for which a work spindle with the entire bearing arrangement is arranged axially movable within a housing. The driveshaft of the motor is axially spaced apart from the work spindle, and is attached to it by means of a toothed coupling in order to transmit the torque of the motor. The work spindle is fixed within the housing axially by means of compression bushings. In the event of a collision, the work spindle together with the complete bearing arrangement can move along their longitudinal axis within the housing, with the compression bushings deforming plastically. This does indeed protect the bearing arrangement of the spindle, but after a collision the work spindle must be removed and disassembled in order to insert new compression bushings and to align the bearing arrangement again. In addition, the work spindle can move only in the direction of its longitudinal axis, and therefore is insufficiently protected from a lateral or oblique collision.

SUMMARY OF THE INVENTION

The purpose of the invention is to create a protection device for a motor spindle which permits not only an axial displacement but also a tilting motion of said motor spindle in the event of a lateral load and which enables return to the starting position in an installed state, at the lowest possible cost.

This problem is solved by means of a protection device having the features as set forth in the independent claim. Practical improvements and advantageous embodiments of the invention are the object of the dependent claims.

The protection device according to the invention is composed of an inner ring permanently joined to the motor spindle and an outer ring joined to the housing. To be understood as the housing shall be any suitable receiver for the motor spindle, such as the feed carriage or else the machine framework of a machine tool and the like. Therefore, the outer contour of the outer ring, rather than also necessarily being round, can be adapted to the respective machine. The inner ring is arranged to be axially movable and tiltable in the outer ring and is placed under axial preload in an elastically resilient manner against the outer ring by means of preloading members. The preloading members hold the inner ring within the outer ring with a predetermined preloading force, with this consequently fixing the motor spindle relative to the housing. The preload predetermined by means of the preloading members is configured such that the inner ring, for a normal load in accordance with the application, does not move in relation to the outer ring. Said preload can differ according to the intended use and construction of the machine tool. If, however, the force acting upon the motor spindle, e.g., in the event of a collision, exceeds the threshold value predetermined by the preloading members, the motor spindle can give way by means of a motion of the inner ring, with not only an axial shifting, but also a tilting motion of the motor spindle being possible in the event of a lateral or oblique force acting on the spindle axis. This optimally protects the motor spindle from damage even in the event of a collision having an effective force oblique to the central axis. In addition, a shifting of the inner ring relative to the outer ring causes the preload brought about by the elastically resilient preloading members to increase, thus dissipating kinetic energy from the feeding motion and causing the generation of a braking effect. Relative motion between the inner and outer ring can be detected by a suitable sensor and used as a signal to switch off the feed drive.

An additional advantage of the protection device according to the invention consists in the fact that the motor spindle, after being shifted due to a collision, can automatically move to its starting position again. After a possible collision, the elastically resilient preloading member causes the inner ring to be automatically shifted to its original position again, such that an elaborate disassembly and subsequent alignment is not required.

The preloading members can advantageously be configured as pressure springs that press an end face of the inner ring against an annular supporting surface of the outer ring. The preloading members can, however, also be configured as elastic-resilient pressure elements or as hydraulic or pneumatic cushions and the like.

In order to improve damping and in order to avoid oscillation, additional radial damping members can be arranged between the inner ring and outer ring. These additional damping members can be used to increase the friction between the inner and outer ring in a defined manner in order to, if necessary, suppress oscillation produced by means of machining force or increased speed. The damping members can be composed, e.g., of several radial retaining elements upon which springs bear, which elements are advantageously movably guided in several radial drilled holes distributed about the circumference of the inner ring, and are intended to engage with indentations in the outer ring. Only when a threshold force has been exceeded are the retaining elements pressed against the force of the springs, by means of which the inner ring can be released. Here also, either a simultaneous release of all retaining elements from the indentations or else also only a partial release in order to tilt the motor spindle is possible. The retaining elements can also serve to support the torque of the motor spindle relative to the housing.

In an advantageous configuration of the invention, the preloading members on the outer ring and/or the damping members on the inner ring are arranged in a uniform distribution about the circumference in order to receive the same releasing moment for any direction of force within the plane (within the X/Y plane) perpendicular to the central axis (Z axis) of the motor spindle. However an asymmetrical arrangement can also be used to deliberately achieve a differentiated release behavior (different in the X and Y direction), should this be required due to the design of the machine tool.

BRIEF DESCRIPTION OF THE DRAWING

Additional specific features and advantages of the invention arise from the following description of a preferred embodiment based on the drawing, which shows one part of a motor spindle having one embodiment of a protection device.

DETAILED DESCRIPTION OF THE INVENTION

Figure 1:
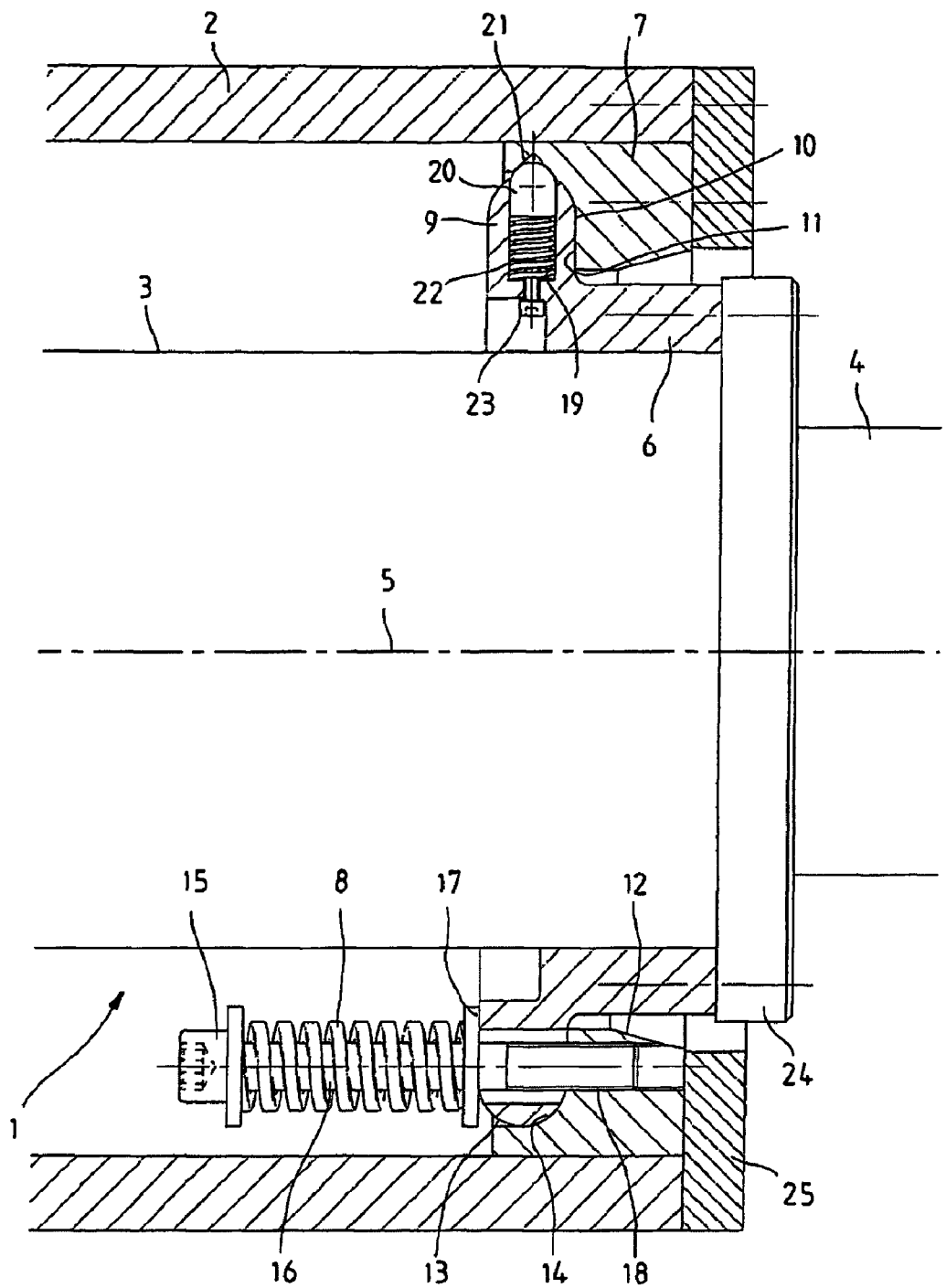

The motor spindle (1) schematically depicted in FIG. 1 is arranged in a housing (2) of a machine tool or the like. Said housing (2) can be, e.g., a feed carriage part, a machine framework or another part of a machine tool. The motor spindle (1) comprises a spindle housing (3) in which a work spindle (4) is rotatably mounted by means of bearings, not represented, about a central axis (5). The motor spindle (1) also features, in a known way, a drive motor arranged in the spindle housing (3), an integrated tensioning device with release unit, an internal lubricant feed, a cooling system etc., and consequently forms a complete drive assembly employed primarily in milling or grinding machinery as a drive unit for the tools, but also for driven tool shafts for lathes, etc.

The motor spindle (1) is held within the housing (2) by means of an inner ring (6) permanently joined to the motor spindle (1) and an outer ring (7) permanently arranged in the housing (2). The inner ring (6) is arranged in the outer ring (7) in a way permitting axial displacement and tilting displacement and is placed under axial preload against the outer ring (7) in an elastically resilient manner by means of preloading members (8). The inner and outer rings create an interface between the machine tool and motor spindle that serves to protect the motor spindle from impact damage.

For the embodiment shown, the outside of the inner ring (6) features an annular flange (9), with the side facing the outer ring (7) including a bearing surface (10) perpendicular to the central axis of the inner ring (6) in order to bear against an annular supporting surface (11) on an inner ledge on one side of the outer ring (7). The other side of the outer ring (7) comprises a diagonal inner surface (12). By means of a semicircular-shaped rounding (13) on the outside of the annular flange (9), the inner ring (6) is additionally supported against a correspondingly rounded bearing face (14) of the outer ring (7). Here the preloading members (8) are executed as compression springs which are arranged on the outer ring (7) in a uniform distribution about its circumference. The preloading members (8) executed as compression springs are mounted between the head (15) of a screw (16) fixed in the outer ring (7) and an inner end face (17), to the left in the drawing, of the inner ring (6). This causes the inner ring (6) to be pressed by means of the preloading members (8) against the outer ring (7). The screws (16) are screwed into the outer ring (7) in threaded holes (18) running perpendicular to its supporting surface (11). The preload force of the preloading members (8) executed as compression springs can thus be adjusted by screwing in or unscrewing the screws (16).

Additionally provided in the annular flange (9) of the inner ring (6), distributed about the circumference, are several radial drilled holes (19) with spring-loaded radial retaining elements (20). The pin-shaped retaining elements (20) feature a ball-shaped free end in order to engage with dome-shaped indentations (21) of the outer ring (7). The retaining elements (20) are movably guided perpendicular to the central axis of the inner ring (6) in the radial drilled holes (19) and are pressed outward by means of springs (22). Screws (23) hold the retaining elements (20) captive within the drilled holes. In addition, the screws here can be used in order to change the preload of the locking pins.

For the embodiment illustrated in the drawing, the spindle housing (3) of the motor spindle features an annular flange (24), onto which the inner ring (6) can be screwed. However, the inner ring can also, e.g., be shrunk onto the spindle housing or be designed as integral with it. The outer ring (7) is permanently attached to the housing (2) by means of a cover disk (25). The outer ring (7) also can be attached to the housing (2) by another means or can be designed as integral with it.

The invention claimed is:

1. A protection device for a motor spindle, the motor spindle arranged in a tool housing and rotatable about a central axis that defines an axial direction and a radial direction, the protection device comprising:
    an inner ring fixedly joined to the motor spindle;
    an outer ring joined to the housing;
    preloading members applying an elastically resilient axial preload in the axial direction to the inner ring against the outer ring; and
    radial damping elements arranged between the inner ring and the outer ring and providing a dampening force in the radial direction operative to dampen vibrations,
    wherein the inner ring is arranged in the outer ring in a way permitting axial motion of the motor spindle along the central axis and a tilting motion of the motor spindle radially away and toward the central axis.

2. The protection device according to claim 1, wherein the preloading members are arranged on the outer ring distributed about a circumference of the outer ring.

3. The protection device according to claim 2, wherein an outside of the inner ring includes an annular flange (9) having a side facing the outer ring that includes a bearing surface to bear against an annular supporting surface of the outer ring.

4. The protection device according to claim 3, wherein a radial outer side of the annular flange of the inner ring includes a semicircular rounding to bear against a correspondingly rounded bearing surface of the outer ring.

5. The protection device according to claim 1, wherein the preloading members are compression springs, and wherein a bearing surface of the inner ring is pressed against an annular supporting surface of the outer ring.

6. The protection device according to claim 1, wherein each of the preloading members is mounted between a head of a screw fixed in the outer ring and an of the inner ring.

7. The protection device according to claim 1, wherein the damping elements each comprise a radial retaining element acted upon by a respective spring.

8. The protection device according to claim 7, wherein each of the retaining elements is movably guided in one of a plurality of radial drilled holes distributed about a circumference of the inner ring and engages with one of a plurality of indentations of the outer ring.

9. The protection device according to claim 1, wherein the inner ring is mounted to an annular flange of a spindle housing of the motor spindle.

10. The protection device according to claim 1, wherein the outer ring is fixedly attached to the tool housing by means of a cover disk.

\* \* \* \* \*